United States Patent [19]
Fryatt

[11] 4,269,305
[45] May 26, 1981

[54] POWERED CONVEYORS

[75] Inventor: Leslie A. Fryatt, Accrington, England

[73] Assignee: J. H. Fenner & Co. Limited, Hull, England

[21] Appl. No.: 39,375

[22] Filed: May 15, 1979

[30] Foreign Application Priority Data

May 31, 1978 [GB] United Kingdom .............. 24837/78

[51] Int. Cl.³ ............................................. B65G 13/06
[52] U.S. Cl. .................................................. 198/781
[58] Field of Search ........................ 198/781, 789–791

[56] References Cited

U.S. PATENT DOCUMENTS 4,164,998  8/1979  Degood et al. ...................... 198/781

FOREIGN PATENT DOCUMENTS 2528569  3/1976  Fed. Rep. of Germany .......... 198/781

*Primary Examiner*—Joseph E. Valenza
*Attorney, Agent, or Firm*—Fred Philpitt

[57] ABSTRACT

In a powered conveyor comprising a frame, a plurality of article-supporting rollers mounted in the frame and a drive belt assembly for supplying driving power to the articles on the rollers, the invention provides that some at least of the belt guide pulleys act as control pulleys and for this purpose carry large diameter rings which are capable of being interposed between the belt and the pulley hub in order radially to displace the belt into driving engagement with an associated article-supporting roller.

9 Claims, 6 Drawing Figures

POWERED CONVEYORS

DESCRIPTION

This invention concerns powered conveyors and relates more especially to powered conveyors of the type wherein articles to be conveyed rest on rollers and drive to those articles is supplied by a driving belt which either is applied directly to the said articles or alternatively is applied to some or to all of the rollers on which the articles rest.

Situations often arise in the operation of conveyors which require numbers of articles, such as boxes or parcels, to be allowed to remain stationary and to accumulate at some point along the conveyor path. When this happens, the drive to the belt must be kept going and must initially be continued to be applied from the belt to the conveyed articles in order that subsequent articles may be fed to the rear of the queue. However, continued application of the drive to the queued articles produces pressure on the articles which accumulates along the length of the queue and can both damage the articles and overload the drive.

It has already been proposed to avoid dangerous pressure accumulation by providing a conveyor with means adapted to disconnect the drive applied to the first article to reach a prescribed region of a conveyor path, for example, the end of the conveyor and arranging sensor means in successive upstream areas of the conveyor which are operable responsive to the arrival of succeeding articles in those areas to cause or initiate the removal of the drive applied to those succeeding articles. Such sensor means may employ the energy available in the driving belt to achieve the removal of drive from the conveyed articles or they may control the operation of separate energy sources but the former is usually preferred.

When circumstances arise, as a result of which the leading article is released, it is usual to restore drive to the next succeeding article and then to continue that restoration successively along the queue as the articles move along the conveyor.

In one widely used arrangement, drive is supplied to the conveyed articles or to the rollers, as the case may be, by applying the driving belt to the same, usually by engaging the top run of the belt against them and conversely, drive is removed by disengaging the belt. In sections of the conveyor path where such belt engagement and disengagement is required, this is often accomplished by supporting the upper run of the belt on a roller carried on a spindle mounted at each end on a bell crank lever or other eccentric member which is actuated responsive to the aforementioned sensor means, thereby to lift the upper run of the belt towards or to lower it from the conveyor path and thus to cause the belt to drive or not to drive the conveyed articles, according to prevailing conditions. Whilst such an arrangement is quite satisfactory for many applications, however, it will be appreciated that it does require the availability of not inconsiderable amounts of sustained energy for its operation and that such energy ultimately represents a demand on the driving power available from the driving belt. For example, the sensor means is often a mechanically displaceable member constituting the input to a mechanical linkage by which the mounting spindle of the belt supporting roller is lifted or lowered, displacement of the said member taking place as a conveyed article comes into contact or releases contact with it. However, the operation of such a mechanical linkage not only draws energy from the driving belt but is dependent upon the force applied to the sensor means and therefore essentially upon the weight of the conveyed article. Thus, it can be difficult to adjust it to respond equally well to relatively heavy and to relatively light articles, for example, to full boxes and to empty ones and for similar reasons, it may not be entirely consistent and reliable in operation. This is particularly the case where, as is usual, the belt supporting roller is biased towards a lifted position and the mechanical linkage is required, where drive is to be removed from the conveyed articles, to overcome that bias and maintain said roller in a lowered position.

According to the present invention a drive belt assembly comprises a drive belt supported on a plurality of guide pulleys of which at least one is a belt control pulley having a hub which is expansible and contractable or has a portion which is effectively of variable diameter for displacing said belt radially of said pulley thereby to occupy respective driving and non-driving positions.

Although the hub of the control pulley may be formed from a plurality of cylindrical segments which are radially displaceable in any convenient way, as by an iris mechanism or by a conical wedge member which can be moved axially into and out of the hub, preferably the hub is circumferentially uninterrupted and carries on it, a larger diameter ring which rests loosely on the hub and is movable axially along it, the ring being thereby adapted to interpose itself between the driving belt and the hub in order to achieve radial displacement of the belt. Removal of the ring from between the belt and the hub permits radial displacement of the belt in the opposite direction.

Preferably the ring has a leading edge (i.e. that edge which first contacts the belt as the ring is moved along the hub towards the belt) which is rounded or chamfered to assist the required interposition.

When used in a conveyor system wherein the driving belt is to be pressed against conveyor rollers mounted as in a frame, each of the drive belt guide pulleys may be a control pulley or such a control pulley may be positioned between spaced pairs of conveyor rollers, as required. Conveniently, the conveyor path may be divided along its length into sections in which axial displacement of the control pulley rings is effected by a lever mechanism or equivalent means actuated by the passage of articles along the conveyor rollers.

The invention will be described further, by way of example, with reference to the accompanying generally diagrammatic drawings, in which.

Figure 1:
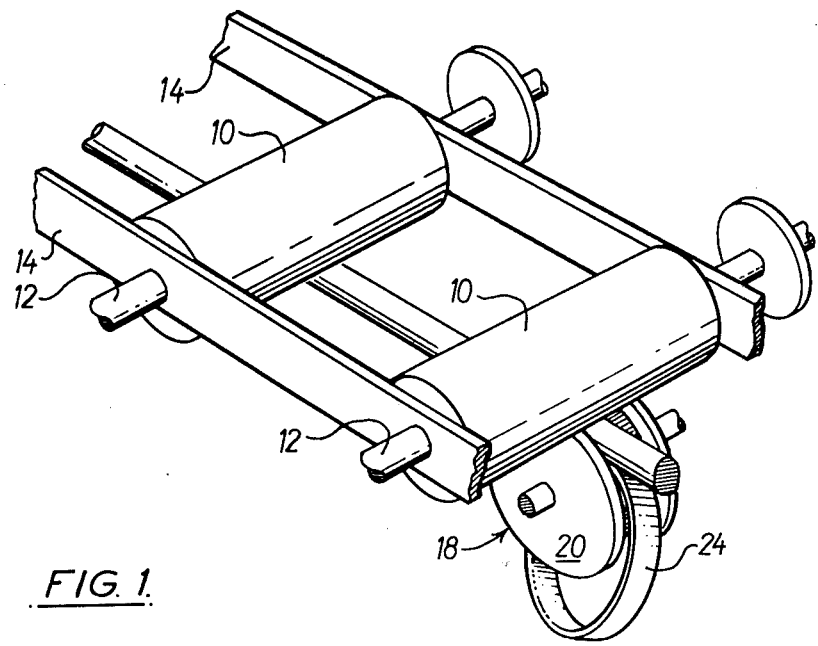
FIG. 1 is a perspective view of a part of a roller conveyor assembly provided with a drive belt assembly embodying the invention.

In the conveyor assembly illustrated in FIG. 1 a plurality of rollers 10 each freely rotatable on a fixed spindle 12 is supported in a frame 14 defining the intended conveyor path. Articles to be conveyed along the the conveyor path are thus supported on the rollers 10 and the latter, in order to impart positive displacement to the conveyed articles, are driven by an endless belt 16 powered as by an electric motor (not shown) in any conventional manner.

To permit the driving power to be removed from the rollers 10 when so required, the driving belt 16 is displaceable towards and away from the rollers by means of guide pulleys 18 on which it is carried. As shown in FIG. 2 each guide pulley comprises a pair of spaced flanges 20 and a hub 22 of lesser diameter than the flanges 20. Upon the hub 22 is freely carried a loose ring 24 which is capable of moving axially along the hub 22 so that it may either be interposed between the hub 22 and driving belt 16 shown in FIG. 2 or it may be axially displaced to take up a position on the hub 22 in which it is out of contact with the driving belt 16, although complete separation is not necessarily required as indicated below.

It will be appreciated that when the ring 24 is interposed between the belt 16 and control pulley hub 22, the arrangement and the respective dimensions of the various components are such that the belt 16 is pressed against the conveyor roller 10 to provide driving power to the latter. Conversely, when the ring 24 is displaced axially along the hub 22 and away from the driving belt 16, the latter is released from driving engagement with the roller 10. Any convenient means may be employed for achieving the required displacement of the ring 24 and for example may comprise a pivotal fork member 25 engaging a region of the ring 24 below the hub 22, pivotal movement of the fork being effected by a lever mechanism actuated responsive to a predetermined condition of articles carried on the conveyor rollers 10 and the motion of which is transmitted to a connecting rod 25a on which the fork member 25 is mounted. It will be appreciated that since only a simple movement of the ring 24 is required, the corresponding power requirements are modest. As indicated in FIG. 2, engagement of the ring 24 between the belt 16 and hub 22 is facilitated by providing the leading edge of the ring 24 with a chamfer 26 and in practice it is found that the axial displacement of the ring 24 along the hub 22 for the purpose of disengaging the belt 16 from the roller 10 need only be such as to allow the belt to rest on the chamfer 26 instead of its illustrated position on the maximum diameter portion of the ring 24. This feature contributes to the modest power requirements for ring displacement.

Figure 2A:
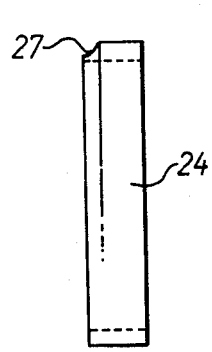
FIGS. 2a and 2b are details showing a modified steering ring.
Figure 2B:
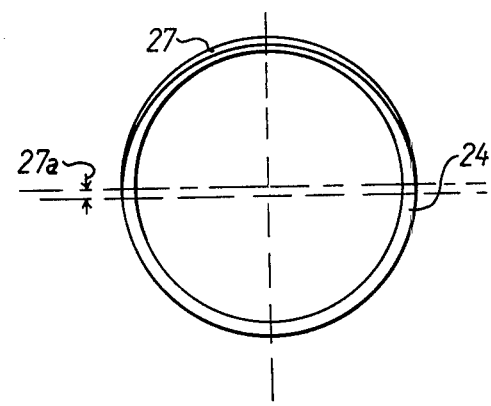
Figure 2:
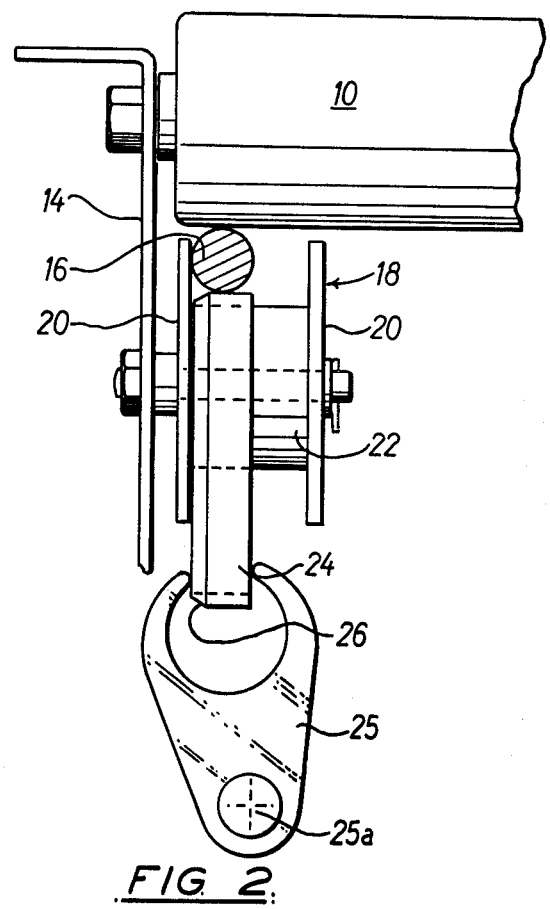
FIG. 2 is a transverse section thereof.

As shown in FIG. 2a, the ring 24 may be provided, in place of the simple chamfer 26, with a chamfered edge 27 which is eccentrically disposed relative to the remainder of the ring, the degree of eccentricity being indicated at 27a in the drawing. The edge 27 has been found to act as an efficient lead-in surface when the ring 24 is required to be returned under the belt 16.

Figure 3:
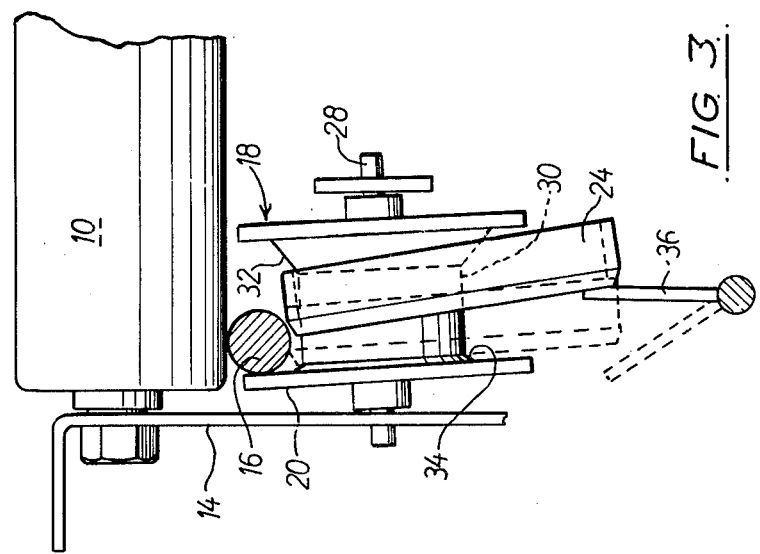
FIG. 3 is a section similar to that of FIG. 2, showing a modification of the drive belt assembly.

Some simplification in the ring actuating means may be achieved as shown in FIG. 3 by mounting the pulley assembly 18 on a spindle 28 which is slightly downwardly inclined towards the frame member 14 so that the ring 24 tends to move under gravity to the position in which it is interposed between the driving belt 16 and the hub of the control pulley. The control pulley hub in this embodiment is indicated by the reference numeral 30 and will be seen to have frusto conical end shoulders 32 and 34 which connect with the pulley flanges 20. The shoulder 32 will be seen to have a somewhat greater axial length than the shoulder 34 and the function of the shoulder 32 is to assist the slope at which the spindle 28 is mounted to encourage the ring 24 to be self-engaging between the belt 16 and hub 30. The shoulder 34 is provided to prevent the ring 24 from contacting the adjoining pulley flange 20 and thereby ensures that at the appropriate time, the ring 24 is freely pivotal on the hub 30 and shoulder 34, in order to assist any disengagement of the ring 24 from the driving belt 16 as shown in FIG. 3. Disengagement is achieved by a simple pivotal lever 36 which abuts a lower region of the ring 24, the pivotal movement of the lever 36 being effected in any convenient way as already described.

Figure 4:
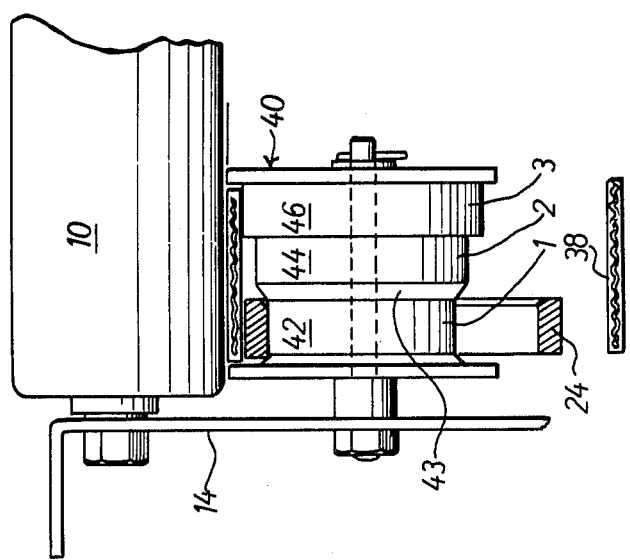
FIG. 4 is a similar transverse section illustrating a further embodiment of the invention.

The embodiment illustrated in FIG. 4 is generally similar to those already described except insofar as it employs a flat rather than a circular section driving belt 38. The control pulley designated 40 will accordingly be seen to have a flange including three stepped diameter regions 42, 44 and 46 with the regions 42 and 44 being connected by a frusto conical shoulder 43. As will be evident the arrangement is such that the ring 24 is disengaged from the belt 38 when the ring is resting on the pulley hub region 42 and under the same conditions the belt 38 is supported on the maximum diameter hub region 46 but still out of contact with the conveyor roller 10. Pivotal movement of the ring 24 to interpose it between the central hub region 44 and the belt 38 urges the latter into driving engagement with the conveyor roller 10.

Although the invention has been described above with respect to a conveyor construction in which the drive belt 16 applies power to some or all of the article-supporting rollers 10, it will be appreciated that it may equally well be applied to conveyors in which the article-supporting rollers are passive or idler rollers, or take the form of skate wheels, and are so arranged as to permit the drive belt to be applied by the control pulleys directly to the conveyed articles.

I claim:

1. In a powered conveyor comprising a frame, a plurality of article-supporting rollers mounted in said frame and a drive belt assembly for supplying driving power to propel articles along a conveyor path defined by said rollers, the improvement wherein the drive belt assembly comprises a plurality of guide pulleys supporting the drive belt of said drive belt assembly, at least one of said guide pulleys constituting a unitary belt control pulley, and a hub on said belt control pulley, which hub is provided with means for effectively varying the diameter thereof for displacing said belt radially of said pulley thereby to occupy respective driving and non-driving positions, said means comprising a ring resting loosely on said hub and means to move said ring axially along the hub, said ring being interposable between said driving belt and said hub in order to effect radial displacement of said belt.

2. A conveyor as set forth in claim 1, comprising a pivotal lever engaging said ring and means for displacing said lever responsive to a predetermined condition of articles carried on the conveyor, thereby to effect the required movement of said ring.

3. A conveyor as set forth in claim 2, wherein said pivotal lever is a fork member, the bifurcations of which are engageable each with a respective side of said ring.

4. A conveyor as set forth in claim 1, wherein the drive belt is arranged for directly contacting and driving at least some of the article-supporting rollers, each driven roller being associated with a belt control pulley, and wherein said ring on said control pulley is interposable between the driving belt and the pulley hub for radially displacing said driving belt into direct driving contact with said driven roller.

5. A conveyor as set forth in claim 4, wherein the belt control pulley is inclined to assist the ring in moving under gravity to a position wherein it is interposed between the driving belt and the pulley hub.

6. A conveyor as set forth in claim 4, wherein leading edge of the ring is chamfered.

7. A conveyor as set forth in claim 6, wherein the chamfer is eccentrically disposed relative to the remainder of the ring.

8. A conveyor as set forth in claim 4, wherein the control pulley hub is of stepped configuration, including axially separated portions of differing diameters connected by a frusto-conical shoulder, the ring being disengaged from the drive belt when resting on the smaller diameter portion and engaging the belt when displaced on to the larger diameter portion.

9. A conveyor as set forth in claim 8, wherein, at its axial end remote from the smaller diameter portion, the hub terminates in a still larger diameter portion whereon the drive belt rests in close-spaced but disengaged relation to the article-supporting roller whenever the ring rests on said smaller diameter portion.

* * * * *